Dec. 11, 1934.     T. W. CARRAWAY     1,984,054
REGULATOR FOR REFRIGERATIVE SYSTEMS
Filed Sept. 8, 1930    2 Sheets-Sheet 1

Thomas W. Carraway,
INVENTOR.

BY Thomas G. Steward,
ATTORNEY.

Dec. 11, 1934.    T. W. CARRAWAY    1,984,054
REGULATOR FOR REFRIGERATIVE SYSTEMS
Filed Sept. 8, 1930    2 Sheets-Sheet 2

Thomas W. Carraway,
INVENTOR.

BY Thomas G. Stewart,
ATTORNEY.

Patented Dec. 11, 1934

1,984,054

UNITED STATES PATENT OFFICE 1,984,054

REGULATOR FOR REFRIGERATIVE SYSTEMS

Thomas W. Carraway, Chicago, Ill., assignor to General Fire Extinguisher Company, Providence, R. I., a corporation of Delaware Application September 8, 1930, Serial No. 480,594

9 Claims. (Cl. 62—3)

This invention relates to the control of a refrigerative system wherein a current of air is cooled by a heat absorbing element through which a refrigerant flows, and said invention, broadly considered, involves an electrically-controlled valve for regulating the flow of the refrigerant, the electrical current which actuates said valve being itself controlled by a displaceable member that is actuated by the air current.

The heat-absorbing element of such a system, always is covered with frost which offers more or less obstruction to the passage of the air current. When the frost becomes thick the flow of air will be reduced, but when it becomes thin the flow of air will be increased. Hence, due to these variations of the air current, it is possible to interpose in the path of said air current the initial member of a regulator for the electrically-controlled valve, whereby the movements of that valve will be determined by variations in the volume and force of the air occasioned by the variable accumulations of frost on the heat-absorbing element.

The invention, in the embodiment thereof herein disclosed, includes a refrigerative circuit having a heat-absorbing element, an electrically-controlled valve for that circuit, means for operating said electrically controlled valve, means for forcing air through said heat-absorbing element, and a displaceable member disposed in the path of the air current for actuating said electrically-controlled valve, whereby constant efficiency of the heat absorbing element will be attained.

Referring to the drawings.

Figure 1:
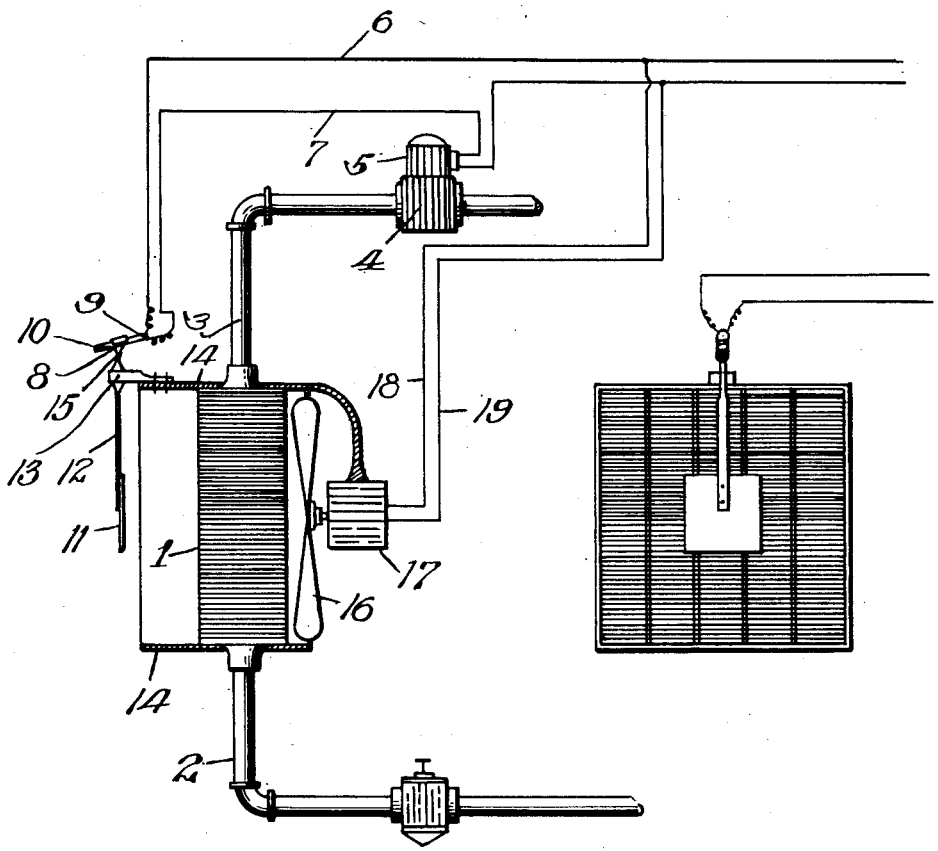
Figure 1 is a view showing the system in elevation.
Figure 2:
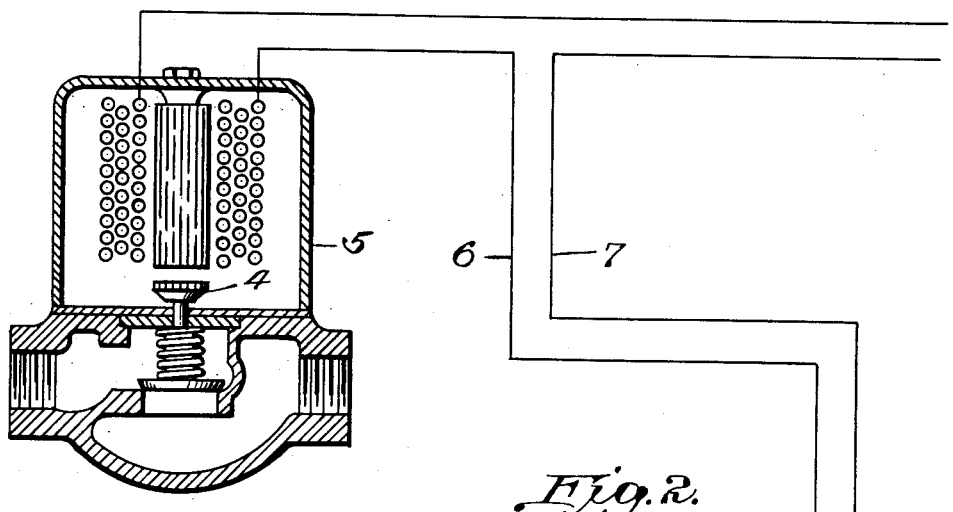
Figure 2 is a view showing details thereof.
Figure 3:
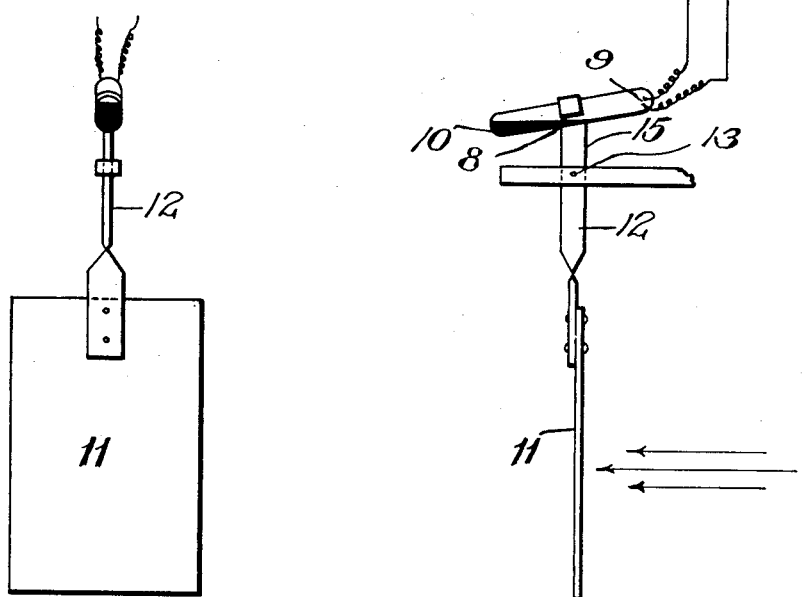
Figure 3 is a view of the initial element of the controlling mechanism.

The system is provided with a heat-absorbing element 1, the elements 2 and 3 being inlet and outlet pipes for the heat-absorbing element 1.

A spring-pressed valve 4, of suitable type, controls the flow of the refrigerant in the circuit, and this valve is actuated by the coil of a solenoid disposed within the casing 5, the controlling circuit for this electro-magnet being indicated by the numerals 6, 7, and being supplied with current derived from any suitable source.

An oscillatory and inclined tubular switch 8 having a contact point 9 and a small quantity of mercury 10 which may move to complete the circuit 6, 7, is employed, but any means which will attain that result will suffice.

Disposed in the path of the air current flowing through the heat-absorbing element 1, is a displaceable member 11 which, preferably, is mounted on a pendent lever 12 pivoted at 13 to a casing 14 so that, normally, it will be held by gravity in a vertical position, but, when actuated by the air current, will swing on its pivot and cause its upper end 15 to so tilt the inclined oscillatory switch 8 as to cause the mercury 10 therein to bridge the contact points 9, and close the circuit 6, 7, to actuate the valve as conditions may determine.

A blower 16, driven by an electrical motor 17 that is supplied with current flowing through conductors 18, 19, preferably is the means for forcing air through the heat-absorbing element 1.

In the operation of the machine, the heat absorbing element is normally free from frost and the refrigerant passes freely through the valve 4 for cooling the current of air driven through the element by the fan 16. The moisture from the air precipitating and freezing upon the surfaces of the element builds up said surfaces and increases their area so as to decrease the area of the passageways through the element and thereby reduces the current and velocity of air passing therethrough. Thus, there is a variation in the velocity of the air current and a corresponding variation in the thermal conductivity and efficiency of the element since the frost is a poor heat conductor.

When the element is free from frost and the air current freely passes therethrough, the member 11 is displaced by the force of the air current so that the mercury switch closes the circuit, energizing the solenoid for holding the valve open to permit the free passage of refrigerant. When the accumulation of frost retards the air passage so that less force is applied against the member 11, it will drop by gravity so that the mercury switch breaks the circuit, deenergizing the solenoid and closing the valve. With the refrigerant shut off, the air is continuously forced over the frosted surface so as to melt the same and carry away the moisture, thereby defrosting the element until the passages therethrough are again sufficiently opened for the air current to displace the member 11 which will cause the valve to open and permit the refrigerant to again pass through the element.

Several of the elements of the invention are diagrammatically shown, since their details of construction do not constitute features of the invention.

It will, of course, be understood that the predominant feature of the invention is the displaceable member 11 which may be of any character so long as its various positions are determined by variations in the velocity of the air current passing over the surfaces of the heat-absorbing element 1, and so long as the movements of the valve 4 are under the control of that displaceable member.

Having thus described my invention, what I claim is:

1. A refrigerative system comprising a heat-absorbing element in a refrigerant circuit; means in said circuit for controlling the flow of refrigerant; means on one side of said element for moving air therethrough; and means on the opposite side of said element in the path of the air flow and actuated in accordance with the variations in velocity thereof for controlling the first named means.

2. A refrigerative system comprising a heat-absorbing element in a refrigerant circuit; an electrically actuated valve in said circuit; means for forcing air over surfaces of said element; and a displaceable member arranged in the path of the air current for controlling the actuating circuit of said valve.

3. A refrigerative system comprising a heat-absorbing element in a refrigerant circuit; an electrically controlled valve in said circuit; means for forcing air over surfaces of said element; a displaceable member arranged in the path of the air current; and a switch actuated by the displacement of said member for operating said valve.

4. A refrigerative system comprising a heat exchange unit in a refrigerant circuit; means in said circuit for controlling the flow of refrigerant; a fan arranged on one side of said unit for driving air therethrough; and a swinging member arranged on the opposite side of said unit and actuated by the air current for controlling said first named means.

5. A refrigerative system comprising a heat exchange unit in a refrigerant circuit; means in said circuit for controlling the flow of refrigerant; means on one side of said unit for forcing a current of air over the surfaces of said unit; and a member pivotally mounted on the opposite side of the unit, displaceable toward and away from said element by variations in the air current for controlling the first named means.

6. A refrigerative system comprising a heat exchange unit in a refrigerant circuit; a valve in said circuit for controlling the flow of refrigerant; a fan on one side of the unit adapted to drive air therethrough; a pivotally mounted vane on the opposite side of the unit adapted to swing in accordance with the air flow through said unit and thereby control the operation of said valve.

7. A refrigerative system comprising a heat absorbing element in a refrigerant circuit; an electrically actuated valve in said circuit for controlling the flow of refrigerant; means for forcing air over the surfaces of said element; a member pivotally mounted on the opposite side of said element from the air forcing means for intercepting the air current passing over the surfaces thereof; and a switch actuated by said member for making and breaking the circuit to said valve, whereby said valve will be opened when said member is forced away from said element and closed when said member moves close by said element.

8. A refrigerative system comprising a heat absorbing element in a refrigerant circuit; a valve in said circuit for controlling the flow of refrigerant; a fan for moving air past said element; and a pivotally mounted member responsive to said air movement for actuating said valve; the air movement affecting said member being in turn affected by the frosting of the element whereby upon the element becoming frosted beyond a predetermined degree the said member responds to close the valve and upon the defrosting of the element the said member responds to open the valve.

9. A refrigerative system comprising a heat absorbing element in a refrigerant circuit; a valve in said circuit for controlling the flow of refrigerant; means for moving air past said element; and a swinging vane mounted in the path of said air adjacent said element; the said air movement being affected by the variation in the defrosting of the element, whereby the vane swings to effect closure of the valve upon said element becoming frosted beyond a predetermined degree and swings to effect opening of the valve upon the defrosting thereof.

THOMAS W. CARRAWAY.